US007947247B2

(12) United States Patent  
Tennent et al.

(10) Patent No.: US 7,947,247 B2
(45) Date of Patent: May 24, 2011

(54) METHOD FOR PREPARING SINGLE WALLED CARBON NANOTUBES FROM A METAL LAYER

(75) Inventors: Howard Tennent, Kennett Square, PA (US); Hai-feng Zhang, Belmont, MA (US); Jun Ma, Lexington, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 1086 days.

(21) Appl. No.: 11/693,203

(22) Filed: Mar. 29, 2007

(65) Prior Publication Data

US 2011/0002838 A1      Jan. 6, 2011

Related U.S. Application Data

(63) Continuation-in-part of application No. PCT/US2006/012001, filed on Mar. 29, 2006.

(60) Provisional application No. 60/743,927, filed on Mar. 29, 2006.

(51) Int. Cl.
    *B82B 3/00*          (2006.01)

(52) U.S. Cl. .............. 423/447.1; 423/DIG. 12; 977/842
(58) Field of Classification Search ............... 423/447.1, 423/DIG. 12; 977/842
    See application file for complete search history.

(56) References Cited

U.S. PATENT DOCUMENTS

| 4,663,230 | A | 5/1987 | Tennent |
| 5,171,560 | A | 12/1992 | Tennent |
| 5,424,054 | A | 6/1995 | Bethune et al. |
| 6,221,330 | B1 | 4/2001 | Moy et al. |
| 6,333,016 | B1 | 12/2001 | Resasco et al. |
| 6,761,870 | B1 | 7/2004 | Smalley et al. |
| 6,949,237 | B2 | 9/2005 | Smalley et al. |
| 7,052,668 | B2 | 5/2006 | Smalley et al. |
| 7,550,128 | B2 * | 6/2009 | Wagner ............ 423/445 B |
| 2002/0031465 | A1 | 3/2002 | Saito |
| 2002/0130610 | A1 | 9/2002 | Gimzewski et al. |
| 2002/0159943 | A1 | 10/2002 | Smalley et al. |
| 2003/0124717 | A1 | 7/2003 | Awano et al. |
| 2004/0022719 | A1 | 2/2004 | Beguin et al. |
| 2004/0179989 | A1 | 9/2004 | Height et al. |
| 2005/0255030 | A1 | 11/2005 | Tour et al. |
| 2006/0093545 | A1 | 5/2006 | Maruyama et al. |
| 2008/0176069 | A1 | 7/2008 | Ma et al. |
| 2008/0279751 | A1 | 11/2008 | Ma et al. |
| 2009/0286084 | A1 | 11/2009 | Tennent et al. |
| 2010/0221173 | A1 | 9/2010 | Tennent et al. |

FOREIGN PATENT DOCUMENTS

| WO | 0238496 A1 | 5/2002 |
| WO | 2004106234 A1 | 12/2004 |
| WO | 2006130150 A2 | 12/2006 |

OTHER PUBLICATIONS

Charlier, Jean-Christophe, et al., "Growth Mechanisms of Carbon Nanotubes", Carbon Nanotubes, Topics Appl. Phys. 80, 55-81 (2001).
O'Connell, Michael J., et al., "Band Gap Fluorescence from Individual Single-walled Carbon Nanotubes", Science, vol. 297 Jul. 26, 2002.
Doherty, S.P., et al., "Solid-State Synthesis of Multiwalled Carbon Nanotubes", J. Mater, Res., vol. 18, No. 4, Apr. 2003.
Zhang, Y., et al., "Formation of Single-Walled Carbon Nanotubes by Laser Ablation of Fullerenes at Low Temperature", Applied Physics Letters, vol. 75, No. 20 (Nov. 15, 1999).
Dresselhaus, M.S., et al., "Physics of Carbon Nanotubes", Carbon, vol. 33, No. 7, pp. 883-891 (1995).
Maruyama, Shigeo et al., "Snythesis of Single-Walled Carbon Nanotubes with Narrow Diameter-Distribution from Fullerene", Chemical Physics Letters 375, pp. 553-559 (2003).
Moore, Valerie Co., et al., "Individually Suspended Single-Walled Carbon Nanotubes in Various Surfactants", Nano Letters, vol. 3, No. 10, pp. 1379-1382 (2003).
Zheng, Ming et al., "DNA-Assisited Dispersion and Separation of Carbon Nanotubes", Nature Materials, vol. 2 (May 2003).
Chen et al., "Synthesis of Uniform Diameter single-wall Carbon Nanotubes in Co-MCM-41: Effects of the Catalyst Preduction and Nanotube Growth Temperatures," Journal of Catalysis, 225:453-465 (2004).
Jost, O. et al., "Diameter Grouping in Bulk Samples of Single-walled Carbon Nanotubes from Optical Absorption Spectroscopy," Applied Physics Letters, 75(15): 2217-2219 (1999).
Maruyama, et al., "Synthesis of single-walled carbon nanotubes with narrow diameter-distribution from fullerene," Chemical Physics Letters, 375, pp. 553-559 (2003).
Okamoto, A., and Shinohara, H., "Control of Diameter Distribution of Single-Walled Carbon Nanotubes Using the Zeolite-CCVD Method at Atmospheric Pressure," Carbon 43:431-436 (2005).
Zhu, H. et al., "Carbon Nanotubes," Mechanical Industry Press, pp. 169-170 (2003) (Chinese language document; English translation of pp. 169-170 provided). Baker and Harris, Chemistry and Physics of Carbon, Walker and Thrower ed., vol. 14, 1978, p. 83.
Bandow, S., et al., "Effect of the growth temperature on the diameter distribution and chirality of single-wall carbon nanotubes," Physical Review Letters, 80(17):3779-3782 (1998).
Bethune, D S, et al., "Cobalt-catalysed Growth of Carbon Nanotubes With Single-Atomic-Layer Walls," Nature, vol.363, p. 605-607 (1993).
Dai, H., et al., "Single-Wall Nanotubes Produced by Metal-Catalyzed Disproportionation of Carbon Monoxide," Chemical Physics Letters 260: 471-475 (1996).
de Heer, Walt A., "Nanotubes and the Pursuit of Applications," MRS Bulletin, Apr. 2004.

(Continued)

*Primary Examiner* — Stuart Hendrickson

(57) ABSTRACT

Methods of preparing single walled carbon nanotubes are provided. An arrangement comprising one or more layers of fullerene in contact with one side of a metal layer and a solid carbon source in contact with the other side of metal layer is prepared. The fullerene/metal layer/solid carbon source arrangement is then heated to a temperature below where the fullerenes sublime. Alternatively, a non-solid carbon source may be used in place of a solid carbon source or the metal layer may simply be saturated with carbon atoms. A multiplicity of single walled carbon nanotubes are grown on the fullerene side of the metal layer, wherein at least 80% of the single walled carbon nanotubes in said multiplicity have a diameter within ±5% of a single walled carbon nanotube diameter D present in said multiplicity, said diameter D being in the range between 0.6-2.2 nm.

41 Claims, 3 Drawing Sheets

OTHER PUBLICATIONS

Guo, T., et al., "Catalytic growth of single-walled nanotubes by laser vaporization," Chem. Phys. Lett., vol. 243: Issues 1-2, pp. 49-54 (1995).

Hata, K., et al., "Water-Assisted Highly Efficient Synthesis of Impurity-Free Single-Walled Carbon Nanotubes," Science, vol. 306, pp. 1362-1364 (2004).

Hu, M., et al., "Morphology and chemical state of Co-Mo catalysts for growth of single-walled carbon nanotubes vertically aligned on quartz substrates," Journal of Catalysis, 225, pp. 230-239 (2004).

Iijima, S., "Helical microtubules of graphitic carbon," Nature 354:56-58 (1991).

Iijima, S. and Ichihashi,T., "Single-shell carbon nanotubes of 1-nm diameter," Nature, vol.363, pp. 603-605 (1993).

Jishi, et al., "Phonon modes in carbon nanotubes," Chemical Physics Letters, 209:77-82 (1993).

Jorio, A, et al., "Structural (n,m) Determination of Isolated Single-Wall Carbon Nanotubes by Resonant Raman Scattering," Physical Review Letters, The American Physical Society, vol. 86, No. 6, pp. 1118-1121 (2001).

Kataura, H., et al., "Diameter Control of Single-walled Carbon Nanotubes," Carbon 38:1691-1697 (2000).

Kitiyanan, B., "Controlled production of single-wall carbon nanotubes by catalytic decomposition of CO on bimetallic Co-Mo catalysts," Chemical Physics Letters, 317:497-503 (2000).

Li, Y., et al., "Growth of Single-Walled Carbon Nanotubes from Discrete Catalytic Nanoparticles Various Sizes," J. Phys. Chem. B, vol. 105:11424-11431 (2001).

Maruyama, et al., "Low-temperature synthesis of high-purity single walled carbon nanotubes from alcohol," Chemical Physics Letters, 360, pp. 229-234 (2002).

Morjan, R.E., et al., "Growth of carbon nanotubes from C60" Applied Physics A 78:253-261 (2004).

Oberlin, A. & Endo, M., "Filamentous Growth of Carbon Through Benzene Decomposition," J. of Crystal Growth, vol. 32, pp. 335-349 (1976).

Rodriguez, N., "A Review of Catalytically Grown Carbon Nanofibers," J. Mater. Research, vol. 8, pp. 3233-3250 (1993).

Thess, A., et al., "Crystalline Ropes of Metallic Carbon Nanotubes," Science, 273:483-487 (1996).

Weaver, J.H., "Totally Tubular," Science 265, pp. 611-612 (1994).

* cited by examiner

METHOD FOR PREPARING SINGLE WALLED CARBON NANOTUBES FROM A METAL LAYER

This application claims the benefit of and priority to U.S. Ser. No. 60/743,927, filed Mar. 29, 2006, the contents of which are hereby incorporated by reference. This application is also a continuation in part of PCT/US2006/012001, filed Mar. 29, 2006, which claims the benefit of and priority to U.S. Ser. No. 60/665,996, filed Mar. 29, 2005, the contents of both of which are hereby incorporated by reference.

BACKGROUND OF THE INVENTION

Field of Invention

The invention relates to methods for preparing single walled carbon nanotubes. More specifically, the invention relates to methods for preparing single walled carbon nanotubes from a metal layer which is in contact with fullerenes on one side and in contact with a solid carbon source on the other side. Alternatively, instead of a solid carbon source, the metal layer may be saturated with carbon atoms or may be in contact with a non-solid carbon source.

Carbon Nanotubes

This invention lies in the field of carbon nanotubes (also known as fibrils). Carbon nanotubes are vermicular carbon deposits having diameters less than $1.0\mu$, preferably less than $0.5\mu$, and even more preferably less than $0.2\mu$. Carbon nanotubes can be either multi walled (i.e., have more than one graphite layer on the nanotube axis) or single walled (i.e., have only a single graphite layer on the nanotube axis). Other types of carbon nanotubes are also known, such as fishbone fibrils (e.g., resembling nested cones), etc. As produced, carbon nanotubes may be in the form of discrete nanotubes, aggregates of nanotubes (i.e., dense, microscopic particulate structure comprising entangled or bundled carbon nanotubes) or a mixture of both.

Carbon nanotubes are distinguishable from commercially available continuous carbon fibers. For instance, the diameter of continuous carbon fibers, which is always greater than $1.0\mu$ and typically 5 to $7\mu$, is far larger than that of carbon nanotubes, which is usually less than $1.0\mu$. Carbon nanotubes also have vastly superior strength and conductivity than carbon fibers.

Carbon nanotubes also differ physically and chemically from other forms of carbon such as standard graphite and carbon black. Standard graphite, because of its structure, can undergo oxidation to almost complete saturation. Moreover, carbon black is an amorphous carbon generally in the form of spheroidal particles having a graphene structure, such as carbon layers around a disordered nucleus. On the other hand, carbon nanotubes have one or more layers of ordered graphenic carbon atoms disposed substantially concentrically about the cylindrical axis of the nanotube. These differences, among others, make graphite and carbon black poor predictors of carbon nanotube chemistry.

Multi walled and single walled carbon nanotubes differ from each other. For example, multi walled carbon nanotubes have multiple layers of graphite along the nanotube axis while single walled carbon nanotubes only have a single graphitic layer on the nanotube axis.

The methods of producing multi walled carbon nanotubes also differ from the methods used to produce single walled carbon nanotubes. Specifically, different combinations of catalysts, catalyst supports, raw materials and reaction conditions are required to yield multi walled versus single walled carbon nanotubes. Certain combinations will also yield a mixture of multi walled and single walled carbon nanotubes.

Processes for forming multi walled carbon nanotubes are well known. E.g., Baker and Harris, *Chemistry and Physics of Carbon*, Walker and Thrower ed., Vol. 14, 1978, p. 83; Rodriguez, N., *J. Mater. Research*, Vol. 8, p. 3233 (1993); Oberlin, A. and Endo, M., *J. of Crystal Growth*, Vol. 32 (1976), pp. 335-349; U.S. Pat. No. 4,663,230 to Tennent et al.; U.S. Pat. No. 5,171,560 to Tennent et al.; Iijima, Nature 354, 56, 1991; Weaver, Science 265, 1994; de Heer, Walt A., "Nanotubes and the Pursuit of Applications," *MRS Bulletin*, April, 2004; etc. All of these references are herein incorporated by reference.

Processes for making single walled carbon nanotubes are also known. E.g., "Single-shell carbon nanotubes of 1-nm diameter", S Iijima and T Ichihashi *Nature*, vol. 363, p. 603 (1993); "Cobalt-catalysed growth of carbon nanotubes with single-atomic-layer walls," D S Bethune, C H Kiang, M S DeVries, G Gorman, R Savoy and R Beyers *Nature*, vol. 363, p. 605 (1993); U.S. Pat. No. 5,424,054 to Bethune et al.; Guo, T., Nikoleev, P., Thess, A., Colbert, D. T., and Smalley, R. E., Chem. Phys. Lett. 243: 1-12 (1995); Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996); Dai., H., Rinzler, A. G., Nikolaev, P., Thess, A., Colbert, D. T., and Smalley, R. E., Chem. Phys. Lett. 260: 471-475 (1996); U.S. Pat. No. 6,761,870 (also WO 00/26138) to Smalley, et. al; "Controlled production of single-wall carbon nanotubes by catalytic decomposition of CO on bimetallic Co—Mo catalysts," *Chemical Physics Letters*, 317 (2000) 497-503; Maruyama, et. al. "Low-temperature synthesis of high-purity single walled carbon nanotubes from alcohol," *Chemical Physics Letters*, 360, pp. 229-234 (Jul. 10, 2002); U.S. Pat. No. 6,333,016 to Resasco, et. al.; R. E. Morjan et al., Applied Physics A, 78, 253-261 (2004), etc. All of these references are hereby by reference.

Additionally, Maruyama, S., "Morphology and chemical state of Co—Mo catalysts for growth of single-walled carbon nanotubes vertically aligned on quartz substrates," Journal of Catalysis, 225, pp. 230-239 (2004), described a method of growing single walled nanotube forest on a flat surface under vacuum. A bimetallic catalyst containing Co and Mo precursor was first deposited on a quartz surface followed by calcination and reduction to form highly dense-packed metal particles. The growth of single-walled carbon nanotubes from these metal particles presented a density of $1 \times 10^{17}/m^2$ with length of approximately 5 micrometers. K. Hata, "Water-assisted highly efficient synthesis of impurity-free single-walled carbon nanotubes," Science, 306, pp. 1362-1364 (2004), described another technique using water-assisted CVD method to grow single-walled carbon nanotube forest from a Si wafer coated with iron thin film. They observed water-stimulated enhanced catalytic activity results in massive growth of superdense ($10^{14}$-$10^{15}/m^2$) and vertically aligned nanotube forests with heights up to 2.5 millimeters. All of these references are hereby by reference.

Other known processes include WO 2006/130150, "Functionalized Single Walled Carbon Nanotubes" and U.S. Pat. No. 6,221,330, "Process For Producing Single Wall Nanotubes Using Unsupported Metal Catalysts And Single Wall Nanotubes Produced According To This Method" Additionally, in "Synthesis of single-walled carbon nanotubes with narrow diameter-distribution from fullerene," *Chem. Phys. Lett.*, 375, pp. 553-559 (2003), Maruyama et al. reported using alcohol as carbon source to grow single-walled carbon nanotubes at relative low temperatures, e.g. 550-800° C. The diameter distribution of those as-grown single-walled nanotubes was found to be very broad (0.8-1.3 nm) and uniformity was poor and temperature dependent. When fullerene was directly applied as carbon source, the authors found some improvement of diameter distribution to 0.8-1.1 nm, but the uniformity was still unclear according to the Raman spectroscopy. All of these references are hereby incorporated by reference.

However, currently known single walled carbon nanotube processes tend to yield a wide distribution of single walled carbon nanotube sizes. Measurements of diameters of single walled carbon nanotubes are usually done using Raman spectrometry. A typical Raman spectrometer equipped with continuous He—Ne laser with wavelength of 632.8 nm is used to collect Raman excitation. A Raman peak at ~1580 cm$^{-1}$ is present in all types of graphite samples such as highly oriented pyrolytic graphite (HOPG), pyrolytic graphite and charcoal. This peak is commonly referred to as the 'G-band'. The peak at 1355 cm$^{-1}$ occurs when the material contains defects in the graphene planes or from the edges of the graphite crystal. This band is commonly referred to as the 'D-band' and the position of this band has been shown to depend strongly on the laser excitation wavelength. "Radial breathing modes (RBM)" (typically below 300 cm$^{-1}$) were observed with single-walled nanotubes, where all the carbon atoms undergo an equal radial displacement. A small change in laser excitation frequency produces a resonant Raman effect. Investigation in the RBM has shown it to be inversely proportional to the SWCNT diameter. This relationship is expressed in the following equation, $$\omega_{RBM} = (223.75/d) \text{ cm}^{-1}$$

where $\omega_{RBM}$ is the RBM frequency, and d is the SWCNT diameter (in nanometers). The relationship is slightly different for determining individual nanotubes. Bandow, et al. "Effect of the growth temperature on the diameter distribution and chirality of single-wall carbon nanotubes," *Physical Review Letters*, 80, pp. 3779-3782 (1998), Jishi, et al. "Phonon modes in carbon nanotubes," *Chemical Physics Letters*, 209, pp. 77-82 (1993). All of these references are hereby incorporated by reference.

In the above equation and throughout this specification, diameter of a nanotube is defined as the distance between the nuclei of carbon atoms at opposite ends of a tube diameter. It is to be understood that this diameter differs from distance of closest approach by a second nanotube which is greater because of the repulsion of the respective π clouds as often defined by TEM.

Table A presents sample diameter and $\omega_{RBM}$ correlations as previously reported in Tables I and II of Jorio, A, et al., "Structural (n,m) Determination of Isolated Single-Wall Carbon Nanotubes by Resonant Raman Scattering," *Physical Review Letters*, The American Physical Society, Vol. 86, No. 6, pp. 1118-21 (Feb. 5, 2001), herein incorporated by reference:

TABLE A

| (n, m) | $d_t$ [nm] | Θ [deg] | $\omega_{RBM}$ (calc) [cm$^{-1}$] | $\omega_{RBM}$ (expt.) [cm$^{-1}$] |
|---|---|---|---|---|
| (18, 6) | 1.72 | 13.9 | 144.4 | 144(2) |
| (19, 4) | 1.69 | 9.4 | 146.8 | — |
| (20, 2) | 1.67 | 4.7 | 148.3 | — |
| (21, 0) | 1.67 | 0.0 | 148.8 | 148(5) |
| (15, 9) | 1.67 | 21.8 | 148.8 | — |

TABLE A-continued

| (n, m) | $d_t$ [nm] | Θ [deg] | $\omega_{RBM}$ (calc) [cm$^{-1}$] | $\omega_{RBM}$ (expt.) [cm$^{-1}$] |
|---|---|---|---|---|
| (12, 12) | 1.65 | 30.0 | 150.3 | 151(3) |
| (16, 7) | 1.62 | 17.3 | 153.0 | 154(5) |
| (17, 5) | 1.59 | 12.5 | 156.4 | 156(6) |
| (13, 10) | 1.59 | 25.7 | 156.4 | 156(1) |
| (18, 3) | 1.56 | 7.6 | 158.8 | 158(1) |
| (19, 1) | 1.55 | 2.5 | 160.0 | 160(3) |
| (14, 8) | 1.53 | 21.1 | 162.0 | — |
| (11, 11) | 1.51 | 30.0 | 164.0 | 164(1) |
| (15, 6) | 1.49 | 16.1 | 166.7 | 165(1) |
| (16, 4) | 1.46 | 10.9 | 170.4 | 169(1) |
| (17, 2) | 1.44 | 5.5 | 172.7 | 174(1) |
| (18, 0) | 1.43 | 0.0 | 173.5 | 176(1) |
| (14, 1) | 1.15 | 3.4 | 215.1 | 210(1) |
| (10, 6) | 1.11 | 21.8 | 223.1 | — |
| (9, 7) | 1.10 | 25.9 | 224.9 | — |
| (11, 4) | 1.07 | 14.9 | 232.2 | 229(1) |
| (10, 5) | 1.05 | 19.1 | 236.1 | 237(2) |
| (12, 2) | 1.04 | 7.6 | 238.2 | — |
| (8, 7) | 1.03 | 27.8 | 240.3 | 239(2) |
| (11, 3) | 1.01 | 11.7 | 244.7 | — |

As the number of complex technical applications for carbon nanotubes increase, there is a need for an improved method for producing single walled carbon nanotubes with a more narrow size or diameter distribution so as to allow for a more precise application of single walled carbon nanotubes.

SUMMARY OF THE INVENTION

The present invention provides novel methods of preparing single walled carbon nanotubes from an arrangement comprising a metal layer, fullerenes in contact with one side of said metal layer, and a solid carbon source in contact with the other side of said metal layer. Once the fullerene/metal layer/solid carbon source assembly has been prepared, it is heated to a temperature below where said fullerenes sublime. The solid carbon source and fullerenes are permitted to dissolve at least in part at the metal layer interface and single walled carbon nanotubes are grown on the fullerene side of the metal layer. The temperature may be increased after the fullerenes have nucleated nanotubes to permit greater growth of single walled carbon nanotubes (e.g., 700-1100° C.).

In an exemplary embodiment, any type of fullerenes may be used (e.g., C60, C70, C100, C36, etc.). The fullerenes may be deposited in one or more layers of closely packed arrangements onto the metal layer.

In an exemplary embodiment, the metal layer may be comprised of a metal catalytic for the growth of single walled carbon nanotubes, such as Fe, Co, Mn, Ni, Cu and Mo. The metal layer is preferably of a thickness which permits the diffusion of carbon from the solid carbon source from one side of the metal layer to the other side of the metal layer (e.g., 1-20 nm, 2-20 nm, 3-5 nm, etc.).

In an exemplary embodiment, the solid carbon source may be carbon fibers or any other solid carbon source known in the art.

In yet another exemplary embodiment, the single walled carbon nanotubes are prepared from a metal layer in contact with fullerenes and a non-solid carbon source using similar methods as described for a metal layer in contact with a solid carbon source.

In a further exemplary embodiment, the single walled carbon nanotubes are prepared from a metal layer in contact with fullerenes and saturated with carbon atoms using similar methods as described for a metal layer in contact with a solid carbon source.

The methods of the present invention grow a multiplicity of single walled carbon nanotubes, wherein at least 80% of said single walled carbon nanotubes in said multiplicity have a diameter within ±5% of a single walled carbon nanotube diameter D present in the multiplicity. Diameter D may range between 0.6-2.2 nm.

DETAILED DESCRIPTION OF THE PREFERRED EMBODIMENTS

Figure 1:
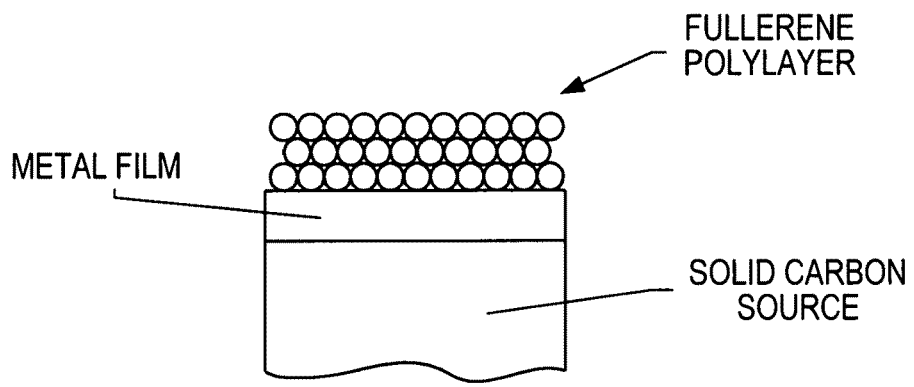
FIG. 1 is an illustration of the fullerene/metal layer/solid carbon source arrangement in accordance with an exemplary embodiment of the present invention.
Figure 2:
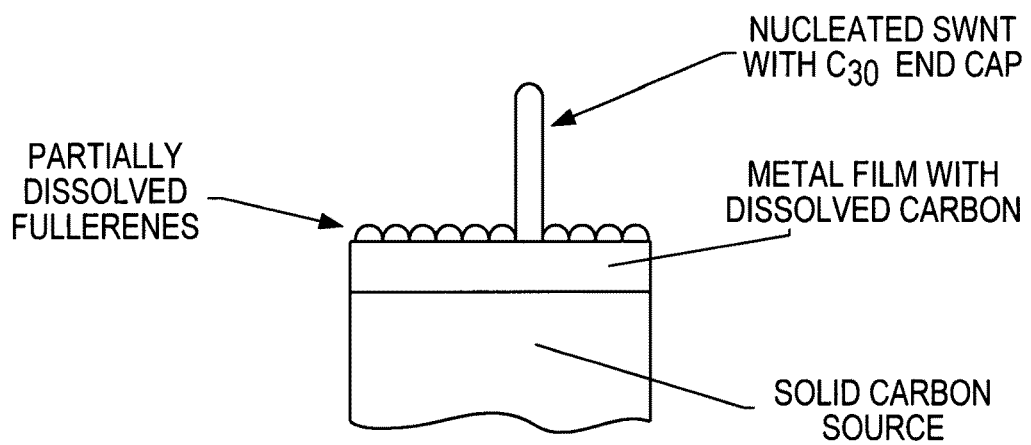
FIG. 2 is an illustration of the dissolving of the fullerenes and the beginning of single walled carbon nanotube growth in accordance with an exemplary embodiment of the present invention.
Figure 3:
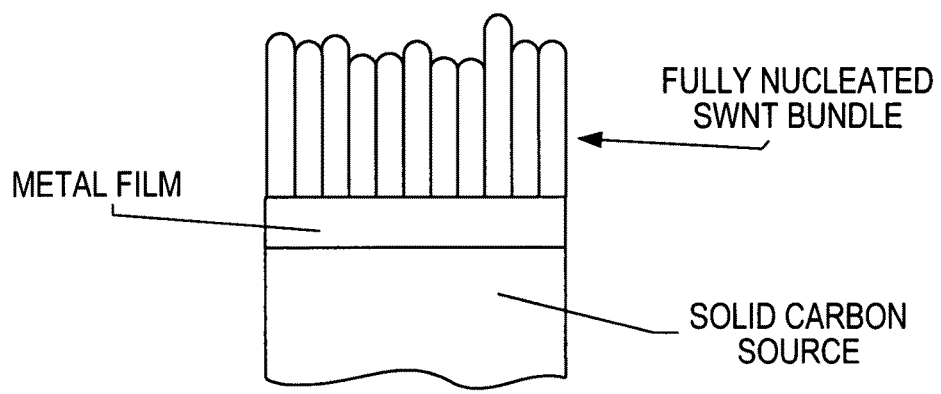
FIG. 3 is an illustration of the growth of single walled carbon nanotubes in accordance with an exemplary embodiment of the present invention.

The present invention provides a new method for preparing single walled carbon nanotubes from an arrangement of fullerenes, a metal layer, and a solid carbon source. In this assembly, a metal layer is formed or placed onto the surface of the solid carbon source, resulting in one side of the metal layer being in contact with and supported by the solid carbon source. Fullerenes are placed or deposited onto the other side of the metal layer. As such, the metal layer is said to be in contact with fullerenes on one side and a solid carbon source on the other side. The assembly of this arrangement can be done in any order.

Once the fullerene/metal layer/solid carbon source arrangement or sandwich has been assembled, it is then heated in an inert atmosphere to a temperature just below (e.g., within 10° C. or within 5° C.) that at which the fullerenes sublime. It will be appreciated that this is a dynamic system: fullerenes are simultaneously vaporizing and dissolving into the metal layer. Thus, the "apparent" sublimation temperature, (e.g., about 650° C. for C60 fullerenes at atmospheric pressure), is best determined by thermogravimetric analysis of an actual sandwich.

Operable temperature ranges can be between about 500° C. to 700° C., at atmospheric pressure, depending on the fullerenes used. If the growth step is carried out at elevated pressures, even higher fullerene sublimation temperatures may be encountered. It is believed that changes in pressure may lead to changes in equilibrium partial pressure of the fullerene in the gas phase, and thus affect the driving force for vaporization. In any event, at the aforementioned temperature, the fullerenes and the solid carbon source dissolve into the metal layer until the thermodynamic activity of the dissolved carbons exceed that of carbons in single walled carbon nanotubes. Specifically, it is believed that the partially dissolved fullerenes in contact with the metal layer at this stage then nucleate or otherwise promote the growth of single walled carbon nanotubes since the thermodynamic activity of carbon in the walls of the single walled carbon nanotube is lower (e.g., more stable) than in the heated fullerene or solid carbon source. Furthermore, as explained below, the partially dissolved fullerene would fittingly serve as an end cap for a single walled carbon nanotube of the same diameter, and thus is an excellent "seed" for single walled carbon nanotube growth.

It is noted however, that the single walled carbon nanotube may be of a different diameter from the original "seeding" fullerene end cap. In the present invention, the fullerene can alternatively also serve as a nucleation promoter. That is, the fullerenes serve to promote the nucleation and growth of single walled carbon nanotubes. Thus, a bundle of single walled carbon nanotubes having a uniform diameter of 1.6 nm may result under certain conditions from 0.7 nm fullerenes. The promotion effect of fullerenes can be seen from the narrow diameter distribution of grown single walled carbon nanotubes. This results in the Raman spectrum of such product usually presenting a single peak in the RBM region instead of multiple signals indicating several different diameter populations.

After growth of single walled carbon nanotubes have been initiated, a gaseous carbon source can be introduced. Useful gaseous carbon sources are CO, hydrocarbons and alcohols. It will be appreciated that introduction of a gaseous carbon source in principle allows the growth process to be carried out indefinitely, rather than being limited by the quantity of solid carbon source. A continuous process is thus feasible.

Since the partially dissolved fullerenes provide the starting nucleation points for the single walled carbon nanotubes, the growth pattern of single walled carbon nanotubes can be influenced by the arrangement of fullerenes on the metal layer. For example, where the fullerenes are arranged in closely packed layers at the surface of the metal layer, single walled carbon nanotubes can grow as a close-packed quasi-crystalline rope or bundle to stabilize the metal-carbon interface. Single walled carbon nanotube growth continues as a result of carbon from the solid carbon source dissolving into one side of the metal layer and diffusing to the other side of the metal layer and into the nucleated tubes.

As explained previously, the initial reaction temperature should be below that at which the fullerenes sublime in order to permit the fullerenes to partially dissolve into, for example, a hemisphere or hemispherical configuration which would be a fitting end cap for single walled carbon nanotubes and thus serve as a "seed" for the growth (or seed to promote the growth) of single walled carbon nanotubes. However, once single walled carbon nanotubes have begun to grow (e.g., the seeding has been completed), there is no longer a need to remain at this sub-sublimation temperature. The reaction temperature may be increased in order to result in higher or faster growth rates (e.g., the lengthening or elongation of the nanotube itself). Preferred higher temperatures range between about 700° C. to 1100° C. The single walled carbon nanotube growth is permitted to continue until a desired or usable length is attained.

Each of the three ingredients are discussed in greater detail below. Other raw materials may also be used.

Fullerenes

Fullerenes are a well known term of art used and recognized in the industry to refer to a form of carbon typically consisting of only carbon atoms bound together to make a roughly spherical ball (e.g., a "buckyball"). As such, the most commonly used fullerenes have sixty carbon and are known as C60 fullerenes. Any other forms of fullerenes which contain more or less than sixty carbon atoms, such as C70, C100, C36, etc., may also be used in accordance with the present invention.

Fullerenes have an approximately spherical shape ("spheroidal"). Coincidentally, the end of single walled carbon nanotubes is typically in the form of a hemisphere. As such, a half-dissolved fullerene (which resembles a hemisphere) would be a fitting end cap for a single walled carbon nanotube of the same diameter. Thus, a partially dissolved fullerene, by its hemispherical nature, would be an excellent "seed" to facilitate single walled carbon nanotube growth because its hemispherical shape is consistent with the hemispherical shape of an end of a single walled carbon nanotube. As such, bundles of single walled carbon nanotubes can be nucleated and grown from a plurality of fullerenes.

Additionally, as the seed or starting nucleation source for single walled carbon nanotube growth, the size of the fullerenes can be used to control the sizes of the single walled carbon nanotubes. For example, a skilled artisan seeking to have predominately larger sized single walled carbon nanotubes would use C100 fullerenes instead of the smaller C36 fullerenes, as the diameter of the C100 fullerenes is larger.

Under this same principle, the use of fullerenes as the seeds or nucleation points also permit greater control over the size/diameter distribution or variation of the single walled carbon nanotubes. For example, using all C60 fullerenes will result in a narrower distribution/variation of single walled carbon nanotube sizes/diameters as compared to other processes which do not control the size of the starting nucleation point or seed.

Metal Layer

The fullerenes are placed on a metal layer which helps to facilitate single walled carbon nanotube growth. In the preferred embodiment, the fullerenes are placed onto the metal later without initial contact with any possible contaminant sources. Known methods for accomplishing this task include sputtering and atomic deposition. Other conventional methods may be used. Preferably, the number of fullerene layers on the metal layer is enough to substantially saturate the metal layer.

In the preferred embodiment, the metal layer is comprised of a metal catalytic for the growth of single walled carbon nanotubes. For example, the metal layer may comprise a metal selected from the group consisting of Fe, Co, Mn, Ni, Cu and Mo. Other metals which can catalyze single walled carbon nanotubes may be used as well.

The metal layer may be in the form of a film, coating, sheet, membrane, etc. It is preferred that the metal layer be uniform in composition and smooth on its surface. The metal layer should be of a thickness that permits the diffusion of dissolved carbon from the carbon solid source (discussed below) on one side of the metal layer to the other side of the metal layer. The thickness of the metal layer may be between about 1 nm to 20 nm, preferably about 2 nm to 10 nm, or more preferably, about 3 nm to 5 nm.

Different metals may result in different thickness limitations depending on its carbon solubility and mass transfer properties. For example, Fe is a preferred metal since its carbon solubility is high and permits more efficient mass transfer of carbon atoms from one side of the metal layer to the other side.

Solid Carbon Source

In contact with the side of the metal layer opposite the fullerenes is a solid carbon source. The solid carbon source provides the supply of carbon atoms which permits the single walled carbon nanotubes to grow. Specifically, the solid carbon source dissolves into the metal layer and diffuses to the other side of the metal layer to become a part of the single walled carbon nanotubes as they grow.

In the preferred embodiment, the solid carbon source is free or substantially free of voids which may interrupt or distort the carbon/metal interface as the carbon dissolves into the metal. The solid carbon source is also preferably free or substantially free of non-carbon heteroatoms which may react with the metal layer to deactivate it or form gases which separate the metal layer from the solid carbon source. If there are heteroatoms present, it is preferred that they not participate in the carbon nanotube growth. For example, hydrogen would be a preferred heteroatom because it dissolves into the metal layer, diffuses through it and then leaves the metal/carbon nanotube interface as hydrogen gas. Preferably, the surface of the solid carbon source in contact with the metal should have a high ratio of edge to basal plane carbon to stabilize the metal film.

There are a number of solid carbon sources that can be used in the present invention. For example, glassy carbon is a viable source if it has not been graphitized to the extent that its thermodynamic activity is lower than that of the single walled carbon nanotubes. Pure carbon pitches such as those made by pyrolysis of polycyclic aromatic hydrocarbons are also a viable solid carbon source, as are cross-linked carbon resins made by cyclotrimerizing or oxidatively coupling diethynylbenzenes. Needle-like crystals of polyparaphenylene made by anodic oxidation of benzene may also be used.

Commercially available carbon fibers are preferred carbon sources. Pitch based as opposed to PAN based carbon fibers are preferred. The most useful carbon fibers are those having as many graphene layer edges as possible on the fiber surface. This can be determined by SEM. Vapor grown carbon nanofibers such as Pyrograf I and Pyrograf III from Applied Sciences Corp. Or VGCF from Showa Denka Corp. are also useful carbon sources.

Other Embodiments

Instead of using a solid carbon source, a non-solid carbon source such as a gaseous or liquid carbon source can be used in place of the solid carbon to provide the supply of carbon atoms which permit the single walled carbon nanotubes to grow. In this embodiment, the non-solid carbon source need not be limited to contacting the metal layer on the side opposite the fullerenes. All that would be required is that the non-solid carbon source diffuse into and/or through the metal layer to become a part of the single walled carbon nanotubes as they grow. Examples of possible gaseous carbon sources include hydrocarbons, CO and alcohols.

In yet another exemplary embodiment, single walled carbon nanotubes may be grown from a metal layer that is saturated with carbon atoms. Any known methods and physical state of the carbon source (e.g., solid, liquid, gasesous) may be used to saturate the metal layer since all that is important in this embodiment is that there be a supply of carbon atoms to permit growth of single walled carbon nanotubes.

The Resulting Single Walled Carbon Nanotubes

The methods of the present invention grow a multiplicity of single walled carbon nanotubes, wherein at least 80% of said single walled carbon nanotubes in said multiplicity have a diameter within ±5% of a single walled carbon nanotube diameter D present in the multiplicity. In other words, the diameter D represents the diameter of a particular single walled carbon nanotube present in the multiplicity by which at least 80% (preferably 80-90%, more preferably 80-95%, even more preferably 80-99%) of the remaining single walled carbon nanotubes within the multiplicity have diameters within ±5% of D. The diameter D may be measured using Raman spectroscopy and is preferably in the range between 0.6-2.2 nm, more preferably 1.0 to 1.8 nm, even more preferably 1.2 to 1.6 nm.

EXAMPLES

Specific details of several embodiments of the invention have been set forth in order to provide a thorough understanding of the present invention. It will be apparent to one skilled in the art that other embodiments can be used and changes made without departing from the scope of the present invention. Furthermore, well known features that can be provided through the level of skill in the art have been omitted or streamlined for the purpose of simplicity in order to facilitate understanding of the present invention.

The following examples further illustrate the various features of the invention, and are not intended in any way to limit the scope of the invention which is defined by the appended claims.

Example 1

Preparation of Solid Carbon Source Through Carbonization of Polymers

Solid carbon source was first prepared via carbonization of polymeric compound. A solution containing 10-30% polymer such as PAM-3k, phenolic resin, polyvinyl chloride and pitch was prepared by dissolving corresponding amount of polymer in a suitable solvent such as water, alcohol, ketone, ester, etc. A platinum wire was then immersed into such solution and a polymer coating was formed on the surface of metal wire after solvent evaporation. The thickness of formed polymer coating was estimated in the range of 1-3 mm. After complete drying, the coated Pt wire was placed mounted inside a metal evaporator, MEM-010 manufactured by Balzers Union Ltd. By passing current through the Pt wire, the Pt wire was heated through its resistance and the polymer was carbonized. The process was monitored by vacuum pressure until no pressure increase was recorded.

Example 2

Preparation of a Sandwich-Structured Catalyst Precursor

Inside the metal evaporator, MEM-010, a tungsten wire was mounted on the electrodes, and some iron or cobalt wire (purity better than 99.99%) was wrapped around the tungsten wire as the metal source for thermal evaporation. The thickness of metal coating was monitored by a quartz positioner. Metal coating of Fe or Co with thickness of 0.5-5 nm was produced on the surface of the carbon-coated Pt wire made in Example 1. Finally, fullerene (purity better than 99.9% from BuckyUSA, Inc) was placed in a stainless steel mesh boat that was further tied on a tungsten wire for fullerene evaporation. A $C_{60}$ coating of 5-10 nm was then formed on metal/carbon coated platinum wire to form a sandwich-structured catalyst precursor as $C_{60}$/[Fe or Co]/solid carbon on the platinum wire.

Example 3

Preparation of a Sandwich-Structured Catalyst Precursor Using Carbon Fibers

The same procedure and setup was applied to make a sandwich-structured catalyst in which a pitch carbon fiber, made by Tech Trade International, Inc, as the solid carbon was applied to replace those from polymer carbonization as described in Example 2. The catalyst was prepared as $C_{60}$/[Fe or Co]/carbon fiber.

Example 4

Making Nanotubes by the Sandwich-Structured Catalyst Precursors

Figure 4A:
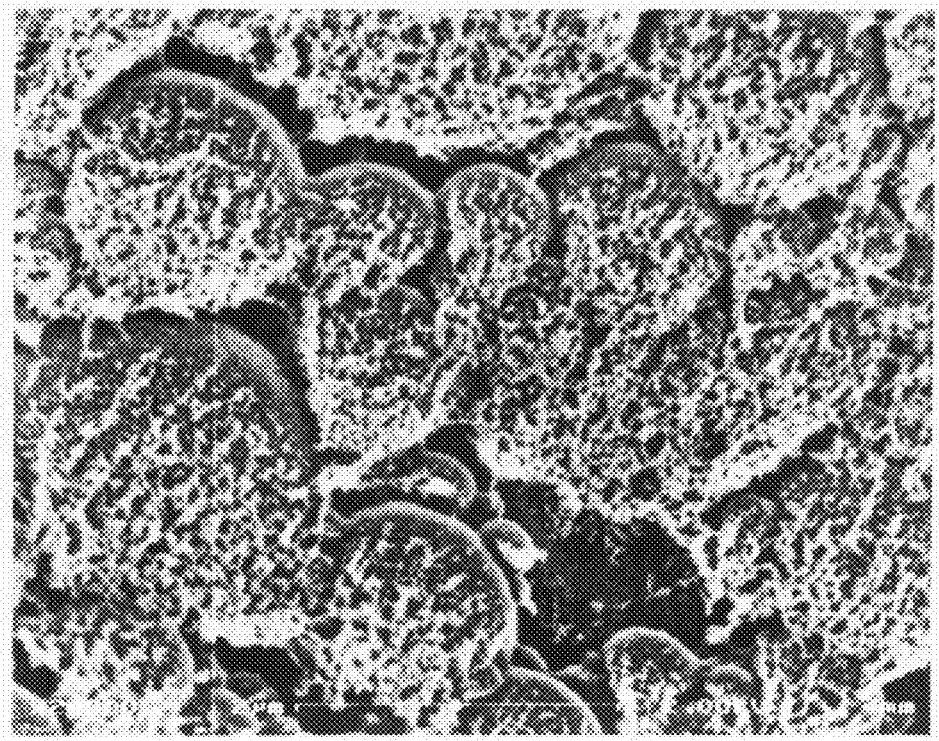
FIGS. 4A and B are SEM micrographs of carbon nanotubes grown on C60/Fe/carbon sandwich-structured catalyst.
Figure 4B:
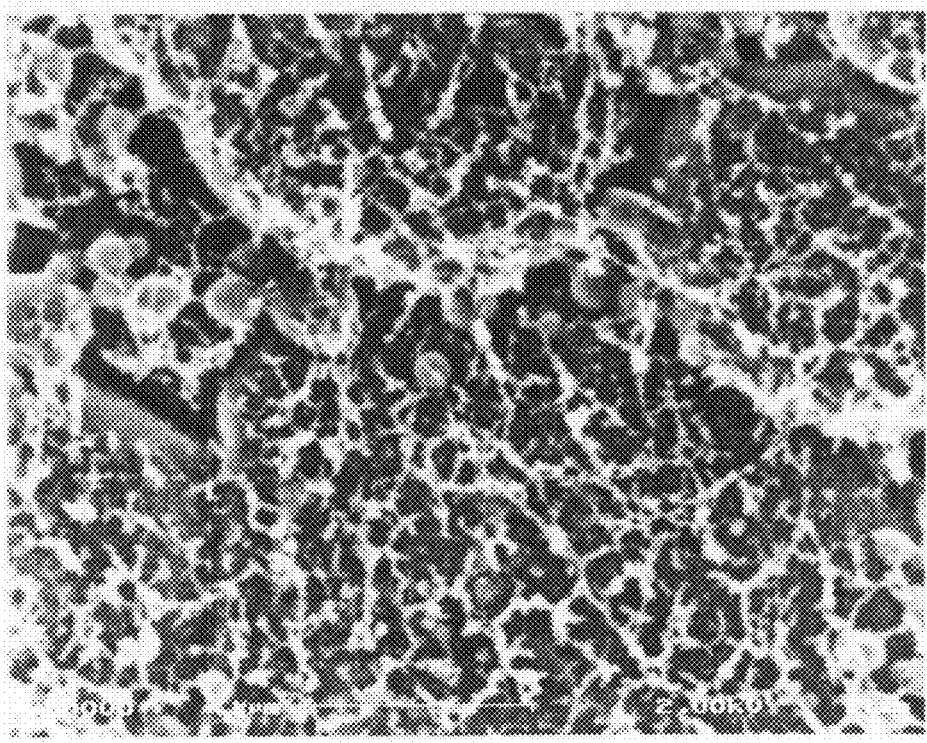
Figure 5A:
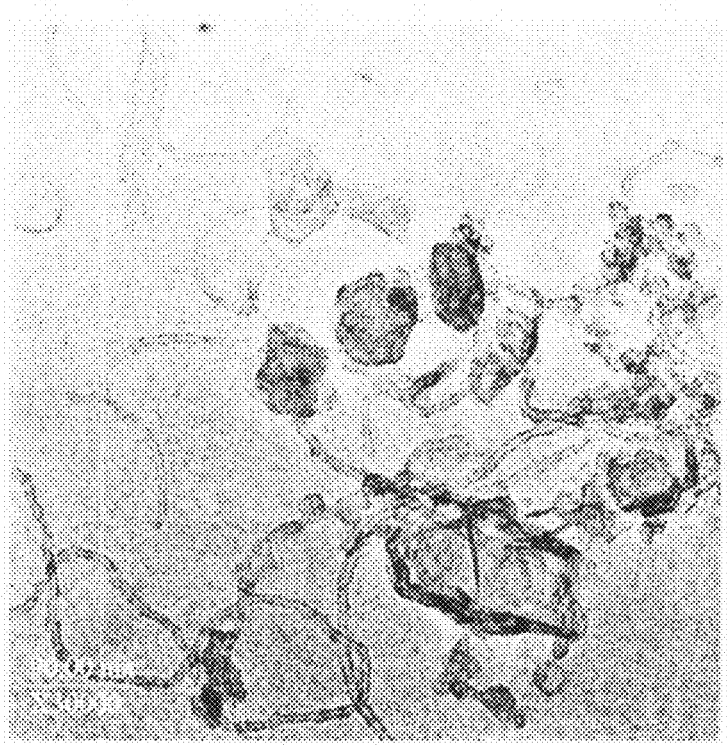
FIGS. 5A and B are transmission electron microscopic images of CNTs grown from a sandwich catalyst.
Figure 5B:
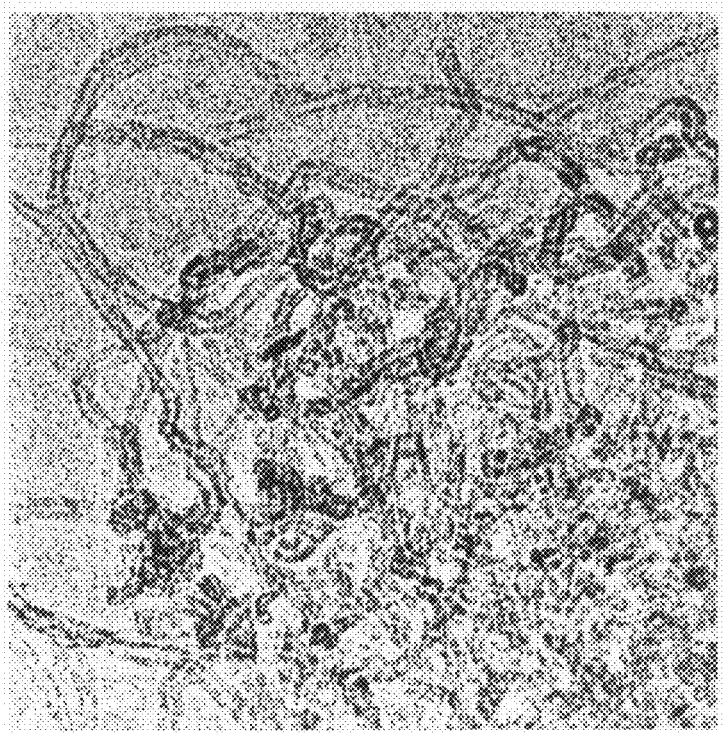

The catalysts made in Example 1, 2 and 3 were heated via resistance heating and controlled at 500-1000° C. via electric current inside the metal evaporator under vacuum. The treated samples were examined by SEM (FIGS. 4A and 4B) and TEM (FIGS. 5A and 5B) and multiwalled carbon nanotubes with diameter of 6-10 nm were observed Example 5

Preparation of a Sandwich-Structured Catalyst Precursor on a Flat Substrate

A sandwich-structured catalyst precursor was prepared similar to the description in Example 1-3. A silicon wafer was first deposited with phenolic resin emulsion via dip coating. Then the coated sample was heated in argon at 1000-1200° C. in order to carbonize the polymer into solid carbon. After the carbon formation, the coated Si wafer was placed in a metal evaporator, e.g. MED-010, and a metal such as Fe, Co, Ni or Cu was deposited on the wafer surface via physical vapor deposition. The thickness of metal coating was monitored by a quartz positioner and controlled at 1-5 nm. Without taking the wafer outside the vacuum chamber, another $C_{60}$ coating was placed on top of metal coating subsequently as described in earlier examples. The thickness of $C_{60}$ was approximately 5-10 nm. The final catalyst format was $C_{60}$/[Fe, Co, Ni or Cu]/solid carbon/Si.

Example 6

Making Carbon Nanotubes from Si Wafer Supported Sandwich-Structured Catalyst Precursor The Si wafer supported catalyst is placed in a 1-inch quartz reactor that has been purged by argon for 10 minutes. Then the reactor is sealed at both ends and the temperature is raised quickly to 800° C. and the sample is allowed to react for 10 minutes under argon. After cooled to room temperature, the sample is examined using Raman, and exhibits characteristic features of single-wall carbon nanotubes with diameter of 1.4±0.2 nm.

We claim:

1. A method for producing a multiplicity of single walled carbon nanotubes with a narrow diameter distribution from a source of carbon, said method comprising:
   (a) preparing an arrangement comprising
      a metal layer,
      at least one layer of fullerenes in contact with one side of said metal layer, and a solid carbon source in contact with the other side of said metal layer;
(b) heating said arrangement to a temperature below where said fullerenes sublime, but at which said fullerenes and said carbon source dissolve into the metal layer; and
(c) growing a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

2. The method of claim 1, wherein the arrangement comprises a number of layers of fullerenes that substantially saturate the metal layer.

3. The method of claim 1, wherein the diameter D is within the range of 1.0 to 1.8 nm.

4. The method of claim 1, wherein the diameter D is within the range of 1.2 to 1.6 nm.

5. The method of claim 1, wherein after growth is initiated the source of carbon comprises a gaseous carbon source.

6. The method of claim 5, wherein the source of carbon comprises CO, alcohol, or a hydrocarbon.

7. The method of claim 1, wherein the metal layer comprises a metal selected from the group consisting of Fe, Co, Mn, Ni, Cu and Mo.

8. The method of claim 7, wherein the metal layer comprises an alloy or other mixtures of Fe, Co, Mn, Ni, Cu and Mo.

9. The method of claim 1, wherein the metal layer is of a thickness between about 1 nm to 20 nm.

10. The method of claim 1, wherein the metal layer is of a thickness between about 2 nm to 10 nm.

11. The method of claim 1, wherein the metal layer is of a thickness between about 3 nm to 5 nm.

12. The method of claim 1, wherein said temperature is between about 500° C. and 700° C.

13. The method of claim 1, wherein said temperature is below the temperature at which the fullerenes sublime as determined by TGA.

14. The method of claim 1, further comprising the step of increasing the temperature above the sublimation temperature of said fullerenes after growth is initiated.

15. The method of claim 14, further comprising the step of increasing the temperature to between 700° C. and 1100° C.

16. The method of claim 1, wherein said solid carbon source comprises carbon fibers.

17. The method of claim 1, wherein said solid carbon source comprises carbon selected from the group consisting of glassy carbon, carbon pitches, cross-linked carbon resins and crystals of polyparaphenylene.

18. The method of claim 1, wherein vapor pressure of the fullerenes is less than 760 mm of Hg.

19. The method of claim 1, wherein vapor pressure of the fullerenes is less than 730 mm of Hg.

20. A method for producing a multiplicity of single walled carbon nanotubes with a narrow diameter distribution from a source of carbon, said method comprising:
(a) preparing an arrangement comprising
a metal layer,
at least one layer of fullerenes in contact with one side of said metal layer, and
a solid carbon source in contact with the other side of said metal layer;
(b) heating said arrangement to a temperature below where said fullerenes sublime;
(c) permitting said at least one layer of fullerenes and said carbon source to dissolve into the metal layer; and
(d) growing a multiplicity of single walled carbon nanotubes having a single raman peak in the RBM region.

21. The method of claim 20, wherein the arrangement comprises a number of layers of fullerenes that substantially saturate the metal layer.

22. The method of claim 20, wherein after growth is initiated the source of carbon comprises a gaseous carbon source.

23. The method of claim 22, wherein the source of carbon comprises CO, alcohol, or a hydrocarbon.

24. The method of claim 20, wherein the metal layer comprises a metal selected from the group consisting of Fe, Co, Mn, Ni, Cu and Mo.

25. The method of claim 24, wherein the metal layer comprises an alloy or other mixtures of Fe, Co, Mn, Ni, Cu and Mo.

26. he method of claim 20, wherein the metal layer is of a thickness between about 1 nm to 20 nm.

27. The method of claim 20, wherein the metal layer is of a thickness between about 2 nm to 10 nm.

28. The method of claim 20, wherein the metal layer is of a thickness between about 3 nm to 5 nm.

29. The method of claim 20, wherein said temperature is between about 500° C. and 700° C.

30. The method of claim 20, wherein said temperature is below the temperature at which the fullerenes sublime as determined by TGA.

31. The method of claim 20, further comprising the step of increasing the temperature above the sublimation temperature of said fullerenes after growth is initiated.

32. The method of claim 31, further comprising the step of increasing the temperature to between 700° C. and 1100° C.

33. The method of claim 20, wherein said solid carbon source comprises carbon fibers.

34. The method of claim 20, wherein said solid carbon comprises carbon selected from the group consisting of glassy carbon, carbon pitches, cross-linked carbon resins and crystals of polyparaphenylene.

35. The method of claim 20, wherein vapor pressure of the fullerenes is less than 760 mm of Hg.

36. The method of claim 20, wherein vapor pressure of the fullerenes is less than 730 mm of Hg.

37. A method for producing a multiplicity of single walled carbon nanotubes with a narrow diameter distribution from a source of carbon, said method comprising:
(a) heating an arrangement to a temperature below where said fullerenes sublime, said arrangement comprising
a metal layer,
at least one layer of fullerenes in contact with one side of said metal layer, and
a solid carbon source in contact with the other side of said metal layer,
(b) permitting said at least one layer of fullerenes and said carbon source to dissolve into the metal layer; and
(c) growing a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

38. A method for producing a multiplicity of single walled carbon nanotubes, said method comprising:
(a) preparing an arrangement comprising
a metal layer, and
at least one layer of fullerenes in contact with one side of said metal layer, said metal layer further being in contact with a non-solid carbon source;

(b) heating said arrangement to a temperature below where said fullerenes sublime;

(c) permitting said at least one layer of fullerenes and said carbon source to dissolve into the metal layer; and (c) growing a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

39. The method of claim 38, wherein said non-solid carbon source is a gaseous carbon source.

40. The method of claim 38, wherein said gaseous carbon source is selected from the group consisting of hydrcarbons, CO and alcohols.

41. A method for producing single walled carbon nanotubes, said method comprising:

(a) preparing an arrangement comprising
   a metal layer, and
   at least one layer of fullerenes in contact with one side of said metal layer,
   said metal layer is saturated with carbon atoms;

(b) heating said arrangement to a temperature below where said fullerenes sublime;

(c) permitting said at least one layer of fullerenes and said carbon source to dissolve into the metal layer; and (c) growing a multiplicity of single walled carbon nanotubes, wherein at least 80% of the single walled carbon nanotubes in said multiplicity have a diameter within ±5% of a single walled carbon nanotube diameter D present in said multiplicity, said diameter D being in the range between 0.6-2.2 nm.

* * * * *

UNITED STATES PATENT AND TRADEMARK OFFICE
CERTIFICATE OF CORRECTION

| | | |
|---|---|---|
| PATENT NO. | : 7,947,247 B2 | Page 1 of 1 |
| APPLICATION NO. | : 11/693203 | |
| DATED | : May 24, 2011 | |
| INVENTOR(S) | : Tennent et al. | |

It is certified that error appears in the above-identified patent and that said Letters Patent is hereby corrected as shown below:

Column 12, Line 16 (Claim 1, Line 1): change "he" to -- the --

Column 13, Line 7 (Claim 38, Line 13): change "(c)" to -- (d) --

Column 13, Line 16 (Claim 40, Line 2): change "hydrcarbons," to -- hydrocarbons, --

Column 14, Line 12 (Claim 41, Line 12): change "(c)" to -- (d) --

Signed and Sealed this
Fifth Day of July, 2011

David J. Kappos
*Director of the United States Patent and Trademark Office*